United States Patent
Kelling et al.

(10) Patent No.: US 8,542,069 B2
(45) Date of Patent: Sep. 24, 2013

(54) METHOD FOR TRIMMING AN ADJUSTABLE OSCILLATOR TO MATCH A CAN-BUS AND A CAN-BUS COMMUNICATION CONTROLLER

(75) Inventors: Ursula Kelling, Neubiberg (DE); Arndt Voigtlaender, Ottobrunn (DE)

(73) Assignee: Infineon Technologies AG, Neubiberg (DE)

( * ) Notice: Subject to any disclaimer, the term of this patent is extended or adjusted under 35 U.S.C. 154(b) by 63 days.

(21) Appl. No.: 13/241,592

(22) Filed: Sep. 23, 2011

(65) Prior Publication Data

US 2013/0076451 A1   Mar. 28, 2013

(51) Int. Cl.
*H03B 28/00* (2006.01)
*G06F 1/04* (2006.01)
*G06F 13/362* (2006.01)

(52) U.S. Cl.
USPC ............... 331/44; 331/172; 710/60; 710/110; 710/117; 713/502

(58) Field of Classification Search
USPC ......... 331/44, 172, 177 R; 375/344; 710/60, 710/61, 110, 117, 124; 713/375, 500–503
See application file for complete search history.

(56) References Cited

U.S. PATENT DOCUMENTS

| | | | | |
|---|---|---|---|---|
| 6,842,808 | B2 * | 1/2005 | Weigl et al. | 710/117 |
| 7,228,450 | B2 * | 6/2007 | Fuehrer et al. | 713/500 |
| 7,230,526 | B2 * | 6/2007 | Wagner | 340/471 |
| 7,472,216 | B2 * | 12/2008 | Fredriksson et al. | 710/305 |
| 7,478,234 | B2 * | 1/2009 | Fredriksson | 713/151 |
| 7,504,902 | B2 * | 3/2009 | Piasecki et al. | 331/176 |
| 7,512,827 | B2 * | 3/2009 | Steffan | 713/501 |
| 7,649,422 | B2 * | 1/2010 | Chen et al. | 331/34 |
| 8,356,201 | B2 * | 1/2013 | Newald | 713/500 |
| 2011/0140740 | A1 * | 6/2011 | Drotleff | 327/48 |

* cited by examiner

*Primary Examiner* — Levi Gannon
(74) *Attorney, Agent, or Firm* — Eschweiler & Associates, LLC

(57) ABSTRACT

A method for trimming a cycle time of an adjustable oscillator to match a Controller Area Network-bus (CAN-bus) operating with a predetermined bit time includes determining a measured number of cycles of an adjustable oscillator between a first signal and a second signal within a CAN frame transmitted on a CAN-bus; determining an information about a present cycle time of the adjustable oscillator using the measured number of cycles and a nominal number of cycles per bit time; and trimming a cycle time of an adjustable oscillator to match the CAN-bus operating with a predetermined bit time based on the determined information.

14 Claims, 3 Drawing Sheets

METHOD FOR TRIMMING AN ADJUSTABLE OSCILLATOR TO MATCH A CAN-BUS AND A CAN-BUS COMMUNICATION CONTROLLER

FIELD

Embodiments of the present invention relate to methods to access a CAN-bus and to methods for trimming an adjustable oscillator to match a CAN-bus operating with a predetermined bit-time.

BACKGROUND

A CAN-bus (Controller Area Network-bus) system or, generally speaking, a system in which a shared media is accessed and used to transmit data, requires that all nodes accessing the medium or the bus adhere to a common timing schedule. Thereby, a CAN-bus node may be an electronic control unit (ECU) that controls one or more of the electrical systems or subsystems e.g. in a motor vehicle. To this end, some systems that do not distribute a common clock signal, such as a CAN-bus, require that each node of the system provides its own clock signal which typically means that each node contains an oscillator. The oscillator of each node defines at which time instance a signal is sampled or transmitted to the bus. In nodes for CAN-buses, for example, the oscillator often has a cycle time which is shorter than the bit-time used to transmit or signal the value of a single bit on the bus. According to a CAN-bus specification, a single bit-time may correspond to a predetermined nominal number of cycles or oscillations of the internal oscillator.

In order to avoid bit-errors on the bus caused by wrong sampling times or wrong transmission times of individual nodes, the local oscillators of all nodes shall be synchronized with each other. While the CAN-bus foresees hard-and-soft synchronization mechanisms, the requirement for the nodes' oscillators are still high in order to not lose synchronization in between the hard- or soft-synchronization events. Accurate oscillators, however, are expensive and may sometimes only be implemented as an additional external oscillator, which is an additional component within a CAN-bus node or a CAN-bus communication controller. This in turn leads to increased assembly costs and increased size of the circuitry of the device.

SUMMARY

According to some embodiments of the present invention, a cycle-time of an adjustable oscillator may be trimmed to match a CAN-bus operating with a predetermined bit-time. The trimming may be performed at a CAN-bus node or at a CAN-bus communication controller. To this end, a measured number of cycles of the adjustable oscillator may be determined between a first and a second signal transmitted within a CAN frame on the CAN-bus. An information about a present cycle-time of the adjustable oscillator may be determined using the measured number of cycles and a predefined, i.e. known, nominal number of cycles per bit-time. That is, the nominal or desired number of cycles per bit-time may be related to the measured number of cycles between two signals transmitted on the CAN-bus in order to determine the information about the present cycle-time of the adjustable oscillator. Based on the determined information, the cycle time of an adjustable oscillator may be trimmed to match the CAN-bus operating with the predetermined bit time. This may enable the use of cheaper adjustable oscillators having a lower absolute accuracy.

According to some embodiments, the cycle-time of the local oscillator may be adjusted when the measured number of cycles deviates from an integer multiple of the nominal number of cycles by more than a tolerance value, such as to trim the cycle-time of the adjustable oscillator to the present set up of the CAN-bus when necessary.

Utilizing a CAN-bus communication controller or a CAN-bus node according to some embodiments of the invention may provide similar benefits. A CAN-bus communication controller for a CAN-bus operating with a predetermined bit-time may include an access unit comprising one or more terminals for signal lines of the CAN-bus in order to detect a first and a second signal transmitted on the bus. The communication controller may furthermore comprise an adjustable oscillator with an output coupled with the access unit to provide an operating clock signal for the access unit. Furthermore, a controller module may be coupled to the adjustable oscillator to determine an information about the present cycle-time of the adjustable oscillator using a measured number of cycles of the adjustable oscillator between the first and the second signals and a nominal number of cycles per bit-time. According to further embodiments, this information may be utilized to adjust or trim the cycle-time of the adjustable oscillator of the communication controller, in order to match the communication controller to the bit-time of the CAN-bus system.

Alternative embodiments of nodes for CAN-buses may utilize a conventional CAN-bus communication controller coupled to an adjustable oscillator in order to receive its operating clock signal. In order to determine information about the present cycle-time of the adjustable oscillator, a controller module may be coupled to the control input of the adjustable oscillator and to a control signal input of the communication controller. In order to determine information about the present cycle-time of the adjustable oscillator, the controller module operates the communication controller such that the communication controller monitors the signal lines of the CAN-bus and indicates the detection of a first and a second signal transmitted on the bus to the controller. The controller module determines the information about the present cycle-time of the adjustable oscillator using the measured number of cycles of the adjustable oscillator between the detection of the first and the second signals and a nominal number of cycles per bit-time.

Thus, also conventional communication controllers may be utilized in CAN-bus nodes running a software for trimming a cycle time of an adjustable oscillator to match a CAN-bus operating with a predetermined bit time.

BRIEF DESCRIPTION OF THE DRAWINGS

Several embodiments of the present invention are illustrated in the enclosed figures, wherein:

FIG. 1b shows exemplary signal timings of CAN-bus signals and of signals of the communication controller of FIG. 1a;

DETAILED DESCRIPTION

Figure 1A:
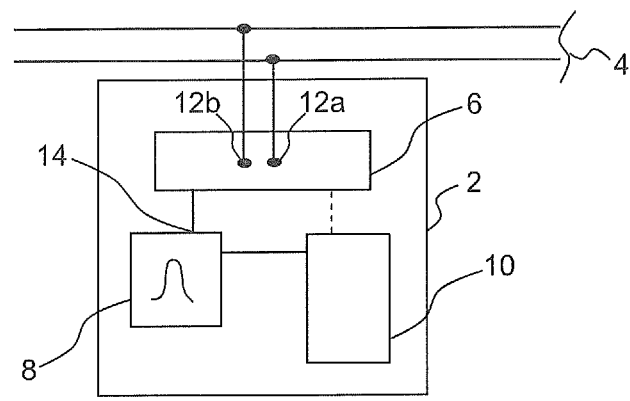
FIG. 1a shows an embodiment of a CAN-bus communication controller.

FIG. 1a shows an embodiment of a CAN-bus communication controller 2 for a CAN-bus 4 operating with a predetermined bit-time. Although the CAN-bus 4 is illustrated as a 2-wire bus, alternative embodiments may be connected to bus systems having one or more wires.

The CAN-bus communication controller 2 comprises an access unit 6, an adjustable oscillator 8, and a controller module 10. The access unit 6 comprises terminals 12a and 12b for the signal lines of the CAN-bus 4. The access unit 6 may be furthermore coupled to an output 14 of the adjustable oscillator 8 in order to receive an operating clock signal of the adjustable oscillator 8. The controller module 10 may be coupled to the adjustable oscillator 8 in order to determine information about the number of cycle-times or oscillations of the adjustable oscillator 8 and in order to trim or adjust the adjustable oscillator 8. In some embodiments, the controller module 10 may optionally be furthermore coupled to the access unit 6.

Figure 1B:
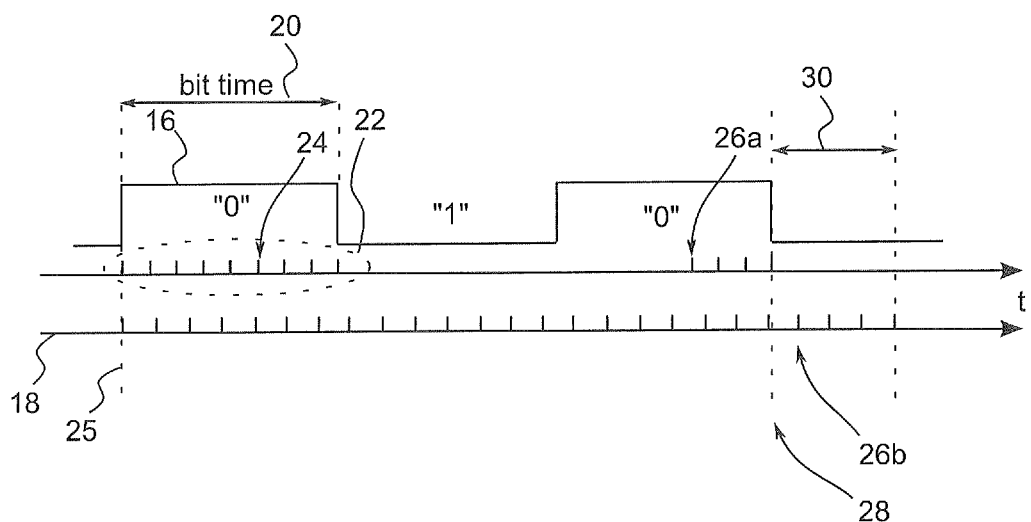

The timing diagram of FIG. 1b shows an example for a signal 16 on the CAN-bus 4 in the upper graph and a consecutive number of cycle-times (also referred to as oscillations or time quanta) of the adjustable oscillator 8 in the lower graph 18. Depending on a predetermined bit-time 20, i.e. the time used to transmit a single bit on the CAN-bus and on a nominal cycle-time (the inverse of the nominal frequency) of the adjustable oscillator 8, each bit-time 20 corresponds to a nominal number of cycles 22 per bit-time 20. In the example illustrated in FIGS. 1a and 1b, the nominal bit-time 20 is, as an example only, chosen to correspond to eight nominal cycle-times of the adjustable oscillator 8.

The cycle-times of the adjustable oscillator 8 may also be denoted as time quanta in CAN-bus specifications. Within the nominal number of cycles 22 associated to each bit time 20, the sample time at which the signal on the CAN-bus is sampled in order to gather the information whether a dominant bit (0) or a recessive bit (1) is transmitted on the bus is defined by the end or the beginning of one particular cycle time of the nominal number of cycles 22. For the example in FIG. 1, it is assumed that the sample time 24 is given by the end of the fifth cycle of the nominal number of cycles 22 per bit-time 20. While FIG. 1b only shows discrete ticks to illustrate possible sample times at the end or the beginning of the associated cycle times of the adjustable oscillator 8, the sampling may be performed also at a leading edge or a falling edge of the signal provided by the adjustable oscillator 8, or at any other reproducible time instant derived from an oscillation of the adjustable oscillator 8.

FIG. 1b shows three consecutive bit-times 20 of the CAN-bus and a transmitted signal sequence 0 (dominant bit), 1 (recessive bit) and 0. In order to illustrate how bit-errors or errors may be caused by an oscillator having an incorrect frequency or an incorrect cycle-time, graph 18 illustrates the output of an oscillator having a cycle-time which is too long.

In the communication controller 2 the sample points or times are derived from the internal clock signal 18 of the adjustable oscillator 8. For the following considerations, a hard-synchronization of the adjustable oscillator 8 to the CAN-bus signal 16 at the start 25 of the transmission of the first bit is exemplarily assumed. If the cycle time or the time quantum provided by or derived from the adjustable oscillator 8 would precisely correspond to a nominal cycle time or to a nominal time quantum, the sampling of the third-bit would take place with correct timing at time 26a, that is, three nominal time quanta before the end of the third bit time or, in other words, 21 cycle times after the hard-synchronization.

However, a mistrimmed oscillator according to FIG. 1b, lower graph 18, would cause a wrong sample value for the third-bit, the reason being as follows. The sampling time is derived from the adjustable oscillator 8 within the communication controller 2 or node connected to the CAN-bus 4. The numbers of cycle times or time quanta are counted with respect to the hard-synchronization at time 25. In this particular example, the number of cycles of the oscillator after the hard-synchronization is 21, which is twice the nominal number of cycles per bit-time (which is 8) plus the sampling position within the nominal number of cycles per bit-time (which is 5). Regardless whether the adjustable oscillator 8 is mistrimmed or not, the number of time quanta after hard-synchronization defines the time for sampling the signal. Sample time 26b corresponds to twenty-one cycle times of the mistrimmed oscillator after the hard-reset. However, at this time already the fourth bit is transmitted on the bus and, therefore, the resulting signal sampled from the bus at time 26b is wrong. In the present example, a logical "1" would be sampled instead of the correct result "0". In summarizing, imprecise oscillators may dramatically increase the number of errors occurring on the bus, or even make communication on the bus impossible.

In order to avoid this problem, some conventional solutions prescribe the use of high-precision oscillators, having a small deviation from a nominal cycle-time. For example, an oscillator used in a conventional CAN-bus node may be allowed to have only 0.3% deviation from its nominal frequency or from its associated nominal cycle-time, which is the inverse of the nominal frequency. These high-precision oscillators, however, are expensive devices and may only be implemented as external oscillators, i.e. as an extra device or element, which is to be implemented into a CAN-bus communication controller or into a CAN-bus node. Instead, internal or on-chip oscillators are cheaper and implemented from a silicon or semiconductor material of the communication controllers or of the logic of the CAN-bus nodes and may have a lower absolute accuracy.

The communication controller 2 of FIG. 1a may facilitate the use of lower precision adjustable oscillators by using a controller module 10 to adjust the adjustable oscillator 8 based on an information about a present cycle of time of the adjustable oscillator 8. To this end, the controller module 10 determines information about the present cycle time of the adjustable oscillator 8, using a measured or determined number of cycles between the detection of first and second signals on the CAN-bus, and the nominal number of cycles 22 per bit-time 20. The information about the present cycle time of the adjustable oscillator 8 may then be utilized to compensate for a mistrimming, i.e. a deviation of the present cycle time from the nominal cycle time, of the adjustable oscillator 8 to achieve a sampling at the right time. To this end, the cycle-time of the adjustable oscillator 8 may be trimmed or adjusted based on the determined information.

According to some embodiments, a deviation from an integer multiple of the nominal number of cycles 22 may be determined as the information about the present cycle-time of the adjustable oscillator 8, In FIG. 1b, for example, the integer multiple of the nominal number of cycles 22 for the third bit is 24. If the first signal is chosen to be the rising edge of the first bit, and if the second signal is chosen to be the falling edge of the third bit, the number of cycles of the adjustable oscillator 8 determined between the detection of the first and second signal is 20, which deviates by four cycle times from the integer nominal multiple of the cycles, which is 24. Thus, the determined deviation 30 is four cycles.

According to some embodiments, the determined deviation may be only considered or the adjustable oscillator 8 may only be adjusted when an integer multiple of the nominal number of cycles 22 deviates by more than a predetermined tolerance value from the measured number of cycles. According to some embodiments, this tolerance value may be one, since the detection of the rising or falling edge on the bus requires subsequent sampling of the signal on the bus at two consecutive cycle times, thus giving an inherent uncertainty of one cycle time or time quantum. According to other embodiments, the adjustable oscillator 8 may only be adjusted when the deviation is greater than or equal to 0.4% of the nominal number of cycles and at least 1. That is, the predetermined tolerance value may be smaller than or equal to 0.4% of the nominal number of cycles. This may speed up the trimming of the adjustable oscillator 8 when a deviation of more than 1 cycle times is detected, which is, however, acceptable since a deviation of the nominal cycle time from the present cycle time is already acceptable.

In this respect, the deviation of the measured number of cycles from an integer multiple of the nominal number of cycles 22 may be understood to be the smallest occurring deviation from any possible multiple of the nominal number of cycles. This allows waiting for a deadtime of an arbitrary number of cycle times of the internal oscillator between the detection of the two signals, without any a priori knowledge about the number of bits expected to pass on the bus during the deadtime.

Figure 2:
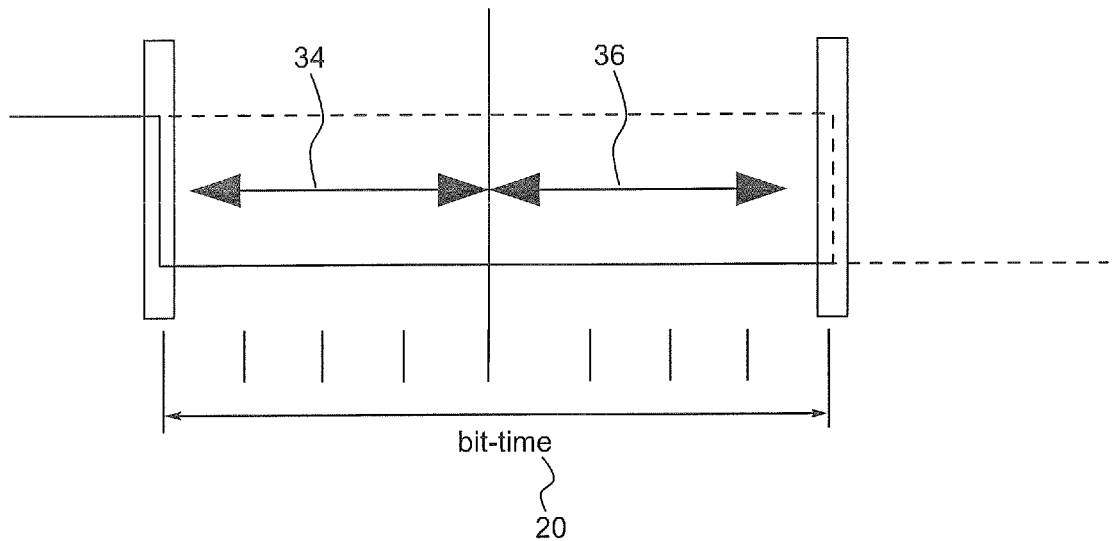
FIG. 2 shows an example for a determination of the deviation of the present cycle-time of an adjustable oscillator from a desired cycle-time.

In other embodiments, the cycle time of an adjustable oscillator 8 may be trimmed, when a calculation "measured number of cycles" MODULO "nominal number of cycles" is performed together with the application of the criterion illustrated in FIG. 2 to evaluate the result of the calculation. The result of the previous calculation may principally be between 0 and the "nominal number of cycles per bit-time −1", i.e. between 0 and 7 in the present example. When allowing a tolerance value of one cycle, i.e. when using a predetermined tolerance value of 1, the cycle time of the adjustable oscillator may be determined to be too short when the result of the calculation is within a first interval 34, i.e. between 2 and one half of the nominal number of cycles per bit time 22. Alternatively, if the result of the calculation is within a second interval 36, i.e. bigger than one half of the nominal number of cycles per bit time 22 and smaller than "nominal number of cycles −2", the cycle-time may be determined to be too long.

In other words, the following calculations may be performed in order to derive the deviation between the measured number of cycles and the nominal number of cycles 22 per bit time 20. Let the nominal number of cycles per bit time be N and the measured number of cycles be M, the deviation D may be calculated as D=M MODULO N. When D turns out to be in the interval [2; N/2], the cycle time may be too short, that is the information about the present cycle time may indicate that the present cycle time is too short. Consequently, when D is within the interval [N/2; N−2], the cycle time may be too long.

Generally speaking, an information about a present cycle time of an adjustable oscillator may be any information allowing to conclude, whether it needs to be adjusted or trimmed. To this end, an information whether its cycle time is too short or too long may be determined. Alternatively, the number of cycles of the deviation, that is the previously defined deviation D may be used as an information about a present cycle time of an adjustable oscillator.

When the cycle-time is determined to be too long, the adjustable oscillator 8 may be adjusted by the controller module 10 such that the cycle-time decreases. Alternatively, the adjustable oscillator 8 may be adjusted to provide a longer cycle-time if the cycle-time is found to be too short.

According to some embodiments of the invention, the adjustment of the cycle-time of the adjustable oscillator 8 may be performed by a predetermined value, regardless what the quantity of the determined deviation is. That is, when the cycle time is found to be too big, the cycle time may be adjusted to decrease by a predetermined quantity. For a DCO (digitally controlled oscillator) the adjustment may be performed by a predetermined number such as 1, 2, 3 or any other value. For a VCO (voltage controlled oscillator), the adjustment may be performed by a predetermined increase or decrease of a voltage supplied to the oscillator. This may decrease the computational complexity and increase system stability in case the system is sensitive to greater jumps of the clock rate at a single instance. This may be particularly relevant when a single central clock or a single adjustable oscillator is utilized to provide the operating clock signal for multiple devices. To this end, PLLs (phase lock loops) or other frequency dividers or multipliers may additionally be present in order to provide different clocks to multiple components within a CAN-bus node or a CAN-bus communication controller.

In order to arrive at an acceptable tolerance, which is at a determined deviation below the predetermined tolerance value, some embodiments may perform the adjustment and the associated measurement several times, for example within a loop, until the desired acceptable deviation is met. Other communication controllers, however, may adjust the cycle-time of the adjustable oscillator 8 by a variable value which depends on the determined deviation, such that a greater determined deviation results in a greater adjustment of the cycle time.

In some further embodiments, only falling edges of a signal or a bit transmitted on the CAN-bus may be detected as the first and second signals. Falling edges may have a smaller associated jitter and, therefore, the results of the measurements may be more reliable.

According to some embodiments, the first signal used as the start of the measurement may be associated to a start-of-frame symbol transmitted at the beginning of a message on a bus, in particular, a start-off-frame bit at the beginning of a CAN-bus message, in order to further utilize the a-priori knowledge of the internal structure of the CAN-bus messages. In particular, some embodiments of the invention may wait for a predetermined number of cycles of the internal oscillator before performing the detection of the second signal, e.g. a second falling edge of a CAN-bus signal, in order to determine a useful result. This may be used in view of the observation that short deadtimes, that is, too few cycle times waited between the two detections, may not provide a useful measurement, since then the clock or the adjustable oscillator may always be precise enough to provide a deviation of zero.

On the other hand, CAN-bus messages may have variable lengths, while it may be desirable to utilize a majority of the messages for the trimming of an adjustable oscillator in order to arrive at a result quickly. For example, remote-frame messages (RTR messages) in general, are shorter than messages containing payload, while even the messages containing payload may have variable lengths.

In order to meet both of the previously described requirements, some embodiments may wait for a predetermined number of cycles of the adjustable oscillator after the detection of the first signal, before starting to detect a second signal on the bus. According to some embodiments, the predetermined number of cycles to be waited for may be a predefined integer of a multiple of the nominal number of cycles, in order to account for the properties of the messages transmitted on the bus.

In the case of CAN-bus communication controllers or nodes, the predefined integer multiple may be chosen from the range between 11 and 24 to meet the previous demands. According to some embodiments, the predefined integer multiple may be chosen to be 23, which allows to use also the shortest possible RTR and payload messages of a CAN-bus protocol for trimming, while providing the maximum deadtime under this constraint. This is particularly the case, since 23 times the nominal number of cycle times per bit is the maximum deadtime affordable after a start-of-frame bit in order to capture a further falling edge on the bus with certainty, considering the minimum length of all allowed payload and RTR-messages on the bus as well as the bit stuffing mechanism of the CAN-bus, which automatically inserts one alternating bit after the occurrence of five subsequent identical bits within a CAN-bus message.

Also in the case of CAN-bus communication controllers, an arbitrary different signal edge or an arbitrary signal may be utilized as the first signal together with any associated alternate deadtime in order to trim an adjustable oscillator to match a CAN-bus with a predetermined bit-time.

Figure 3:
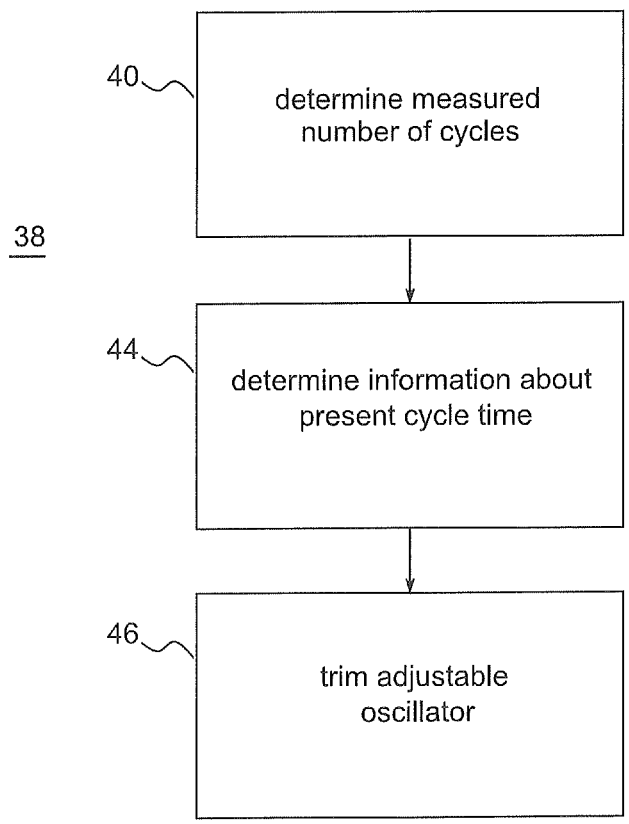
FIG. 3 shows an embodiment of a method for trimming a cycle-time of an adjustable oscillator to match a CAN-bus operating with predetermined bit-time.

FIG. 3 is a schematic block diagram of an embodiment of a method 38 for trimming a cycle-time of an adjustable oscillator to match a CAN-bus operating with a predetermined bit-time. The method illustrated in FIG. 3 may, for example, be performed by the CAN-bus communication controller of FIG. 1a, or by any embodiment of a node for a CAN-bus. In particular, the method may also be performed by a software running on a controllable logic, e.g. on a CPU, FPGA or the like, within a CAN-bus node.

In a measuring step 40, a measured number of cycles of the adjustable oscillator is determined between a first and a second signal transmitted on the CAN-bus within a CAN frame or within a message transmitted on the CAN-bus. That is, the first and second signals may be associated or contained within the same CAN-bus message or CAN frame. To this end, the terms CAN-bus message or CAN frame may be understood as a consecutive number of bits constituting a single message or frame transmitted on the bus according to the protocol details. These may, for example, start with the transmission of a start-of-frame bit after a number of bits identifying an idle time between two consecutive messages or frames. An example for those frames and messages are RTR frames and frames containing payload.

In a determination step 42, information about a present cycle-time of the adjustable oscillator is determined, using the measured number of cycles and a nominal number of cycles per bit time.

In a trimming step 44, a cycle time of an adjustable oscillator is trimmed or adjusted to match the CAN-bus operating with a predetermined bit time based on the determined information about the present cycle time.

Previously, the signals between which the measured number of cycles is determined have been predominantly defined to be falling edges of single bits transmitted on a CAN-bus. However the first and second signals may alternatively also be signal sequences transmitted on the bus, or complex symbols or arbitrary symbols or signals transmitted on a bus system, a shared medium, a mobile communications wireless system or the like.

Figure 4:
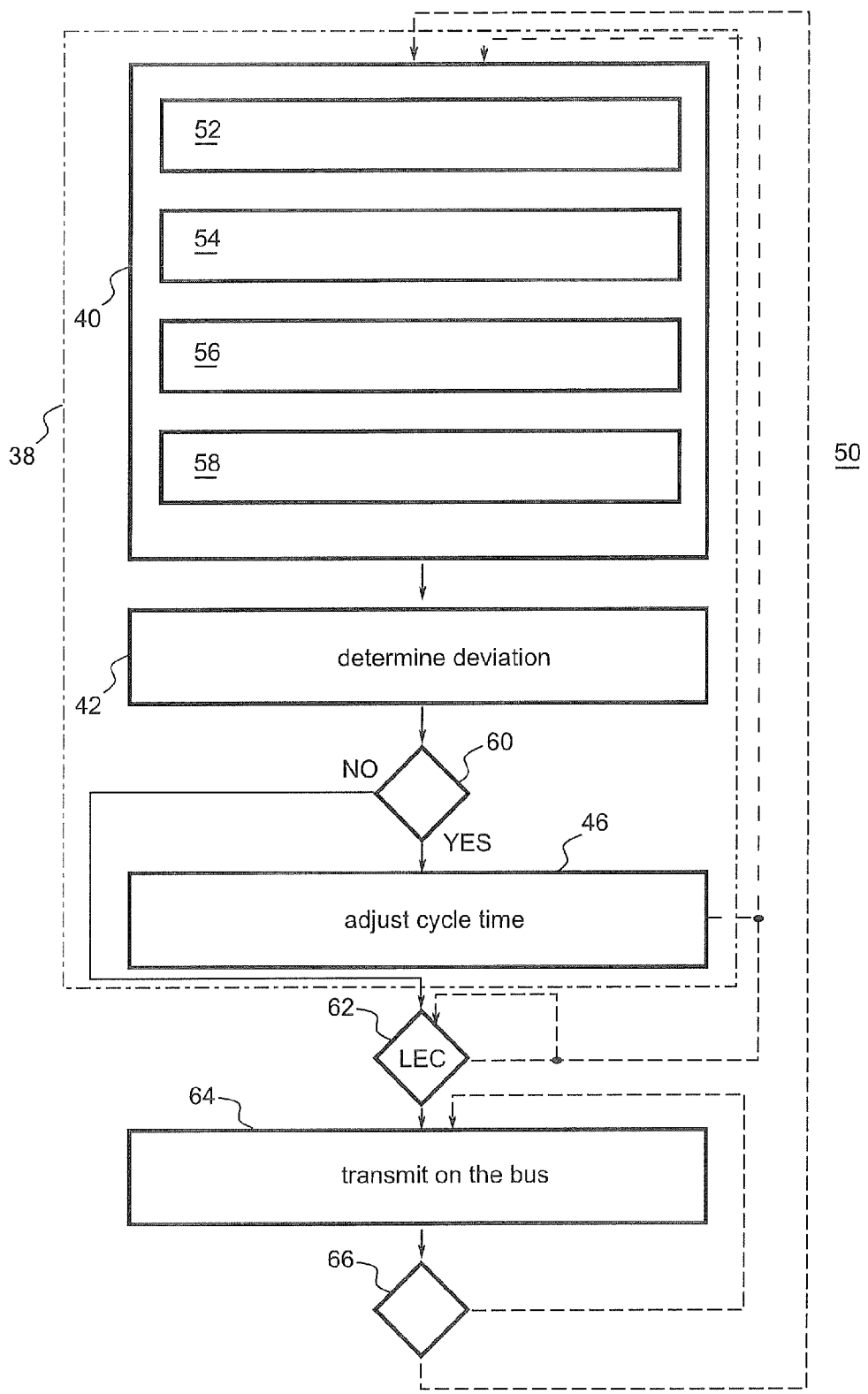
FIG. 4 shows a block diagram of a further embodiment of a method for trimming a cycle-time of an adjustable oscillator and of a method for accessing a CAN-bus.

FIG. 4 shows a block diagram of a further embodiment of a method 38 for trimming a cycle time of an adjustable oscillator to match a CAN-bus operating with predetermined bit-time.

The method 38 is illustrated within a method for accessing a CAN-bus 50, which may be utilized by a CAN-bus communication controller or a CAN-bus node in order to establish and maintain a reliable communication.

In the embodiment shown in FIG. 4, the method for trimming a cycle-time of an adjustable oscillator utilizes the following sub-steps within the measuring step 40 to determine the measured number of cycles. In a first determination step 52, a first falling edge of a start-of-frame bit transmitted on the bus at the beginning of a CAN-bus message is detected. In a deadtime step 54, it is waited for a predetermined number of cycles of the adjustable oscillator 8.

In a subsequent detection step 56, a second falling edge of the signal transmitted on the bus is detected. In determination step 58, the measured number of cycles of the adjustable oscillator between the first and the second falling edges is determined.

In the determination step 42, a deviation between the measured number of cycles and an integer multiple of a nominal number of cycles per bit time is determined.

In a tolerance check 60 it is checked, whether the deviation is greater than the tolerance value. If the answer is "Yes", the cycle-time of the adjustable oscillator is adjusted in the adjustment step 46 and the method 38 to trim the cycle time is re-entered.

If the answer of the tolerance check 60 is "NO", that is when the cycle-time is within a tolerable range and an adjustment is not required, the method may end here.

FIG. 4, however, furthermore illustrates an embodiment of a method 50 for accessing a CAN-bus, which utilizes the method 38. The method for accessing a CAN-bus 50 may be used to initialize a CAN-bus communication controller or a node of the CAN-bus and to successfully maintain access to the CAN-bus, once the initialization has been successfully performed.

As already mentioned above, in order to successfully access a CAN-bus with a CAN-bus communication controller or a CAN-bus node, the method for trimming the cycle-time of the adjustable oscillator 38 may be repeated until the determined deviation is smaller than the tolerance value.

At this instant, a CAN-bus communication controller or CAN-bus node may be switched from a listening mode into an active sending mode, such that transmission of messages of the node or of the communication controller to the bus is activated.

However, according to the method 50 for accessing a CAN-bus illustrated in FIG. 4, messages are only transmitted to the CAN-bus when an error status of a preceding message or of the last message on the CAN-bus indicates no error, an acknowledgment error or a CRC error. To this end, an error checking step 62 evaluates an error status of a message transmitted on the CAN-bus.

If the error checking step provides a positive result, that is if the error status of the last message transmitted on the bus indicates no error, an acknowledgment error or a CRC error, the communication controller or the node incorporating the method of FIG. 4 may be switched into transmission mode and starts to actively transmit messages on the CAN-bus in transmission step 64. This evaluation of the error status may be performed in order to check whether the bus is in a condition which allows for the conclusion that the detection of the signals and the trimming of the oscillator were successful.

In case the further nodes already present and transmitting on the bus transmit no errors, the situation is evident and the node or the communication controller can be switched into the active state. However, an acknowledgement error and a CRC error may also to be accepted in order to avoid that a device incorporating this method remains unable to enter into the active mode when there is only one further node sending or transmitting on the bus. If this is the case, the messages sent from the additional node can be utilized to trim the adjustable oscillator. However, since the node incorporating the message is still in the listen only mode, no acknowledgement will be added to the individual messages of the other node. To this end, acknowledgement errors should not hinder the node or the communication controller incorporating the method shown in FIG. 4 from actively sending messages to the bus.

The same is true in the case of a CRC error which may be detected by the node listening on the bus. Since the only remaining further node on the bus will not receive an acknowledgement signal, it might not update its sending frame buffer, and therefore continuously send the same message having the CRC error (i.e. a message in which the redundancy information does not fit to the payload). For this reason, frames containing a CRC-error should, according to some embodiments, also not hinder the entering of an active mode and such transmitting messages on the bus.

The remaining CAN-bus errors, however, may hinder the node from accessing the bus in a transmission mode. In particular, the errors having CAN-bus error codes 1, 2, 4 and 5 may hinder the node from accessing the bus. CAN-bus error #1 indicates a form-error, while CAN-bus #2 indicates a stuffing error, that is, the occurrence of more than five consecutive identical bits within a CAN-bus message. Error codes #4 and #5 indicate that particular bits (dominant or recessive) can for some reason not be transmitted on the bus. As already previously elaborated, error codes 0 (no error), 3 (acknowledgement error), and 6 (CRC-error) may be acceptable.

According to a further embodiment illustrated in FIG. 4, a stable operation of the CAN-bus may be maintained, when the method of accessing a CAN-bus comprises a continuous monitoring of the error status of the messages on the CAN-bus. To this end, after each transmission or frame occurring on the bus, a global error status may be checked in the monitoring step 66 where the error status of a predetermined number of consecutive messages is monitored. When the error status of all consecutive messages indicates an error, a re-initialization of the CAN-bus communication controller or the CAN-bus node is initiated. This may avoid a possible conflict with a further node permanently sending with a wrong timing which is out of the trimming of the adjustable oscillator of the node incorporating a method for accessing a CAN-bus illustrated in FIG. 4. If, however, not all error statuses of all consecutive messages indicate an error, transmission may proceed.

The following short list of an exemplary computer code illustrates a further embodiment of a method for trimming a cycle-time of an adjustable oscillator and its particular implementation.

The following main function performs some initial configurations and subsequently loops over the determined number of cycles (carried in variable "rx_capture_time_ticks") until the desired deviation of 1 cycle time is achieved. Subsequently, the error condition of the bus is evaluated in order to start actively transmitting on the bus, when the evaluation yields the respective result.

The main routine calls further subroutines which are used to calculate further quantities, such as for example the deadtime (the predetermined number of cycles), which are disclosed below.

The functionality of the individual steps is easily derivable for a person skilled in the art and furthermore described together with the source code, using the commonly known "//" remark indicators.

```
//******************************************************
//** main
//******************************************************
sword main(void)
//send starting message
initial_message( );
// baudrate and system frequency have to be announced for the
SW.norm_bit=adjust_setting_norm_bit(baudrateno);
deadtime=adjust_setting_deadtime(norm_bit, 23); // the maximum
    possible value of 23 bits
send_start(1);
LEC=CAN_NSR0&=0x7; // copy LEC field from CAN0 to check on
errors.
while(LEC!=0)
{
LEC=CAN_NSR0&=0x7; // copy LEC field from CAN0 to check on
errors.
}
stopcounter=1;
while(input!=0x71 && stopcounter) // loop over CAN-bus messages
until the determined // deviation is below the predetermined tolerance
    value of 1
{
still_capturing=1;
timeout=0xFFFFFFFF;
config_cells(deadtime); // deadtime currently programmed to 23
bittimes while(still_capturing && timeout) timeout--;
if (!timeout)
{
// timeout occured
}
if (rx_capture_time_ticks<(deadtime+(norm_bit*11)+(norm_bit>>2)))
// Normal frames
{
stopcounter++;
deviation=0;
trimm=trimming(norm_bit, rx_capture_time_ticks);
if (trimm<0)          // if too fast
deviation=-0.001;
if (trimm>0)          // if too slow
deviation=0.001;
running_frequency+=running_frequency*deviation;// recalc frequency
SSC0_vSendData(running_frequency, 0, 0);//set new frequency
}
else
{
// set marker if not as expected.
}
LEC=CAN_NSR0&=0x7; // copy LEC field from CAN0 to check on
errors.
if (LEC==0 || LEC==3 || LEC==6) // if no error exist, beside of ACK
error // For CRC error the module has to be switched on, as otherwise
you will not have //any successfull communication, as the other side
will continue to send the faulty //CRC for ever.
{
Allow_CAN_talking( ); // switch on the CAN
}
if ( LEC==1 || LEC==2 || LEC==4 || LEC==5 ) // faulty environment
{
if (!(CAN_NCR0&0x80))
switch_CAN_silent( );   // the device shall not disturb the
environment
}
} // end loop until trimming is finished
// Send final message
CAN_vTransmit(10);
CAN_vTransmit(11);
// USER CODE END
return(swReturn);
} // End of function main
```

The following routines are called from the main routine and predominantly used to calculate some quantities used therein, such as for example the information about the present cycle time in the function called "trimming".

```
//*****************************************************************
//** Adjust settings dependent on programmed baudrate
// ** int adjust_setting(int baudrate)
// ** input baudrate_number
// ** output max_timer_to_1_bit
//*****************************************************************
unsigned int adjust_setting_norm_bit(int baudrate)
{
unsigned int max_timer_to_1_bit=0;
switch (baudrate)
{
case 0x31: max_timer_to_1_bit=200; // 50MHz clocked GPTA
break;
case 0x32: max_timer_to_1_bit=100; // 50MHz clocked GPTA
break;
case 0x33: max_timer_to_1_bit=50; // 50MHz clocked GPTA
break;
case 0x34: max_timer_to_1_bit=37; // 50MHz clocked GPTA
break;
case 0x35: max_timer_to_1_bit=25; // 50MHz clocked GPTA
break;
default:   Myprintf("Shoud not occur\n");
line_feed( );
break;
}
return(max_timer_to_1_bit);
}
//end adjust_setting_norm_bit**********************************
//*****************************************************************
// ** Adjust settings dependent on programmed baudrate
//** int adjust_setting(int baudrate)
// ** input baudrate_number
// ** output max_timer_to_1_bit
//*****************************************************************
unsigned int adjust_setting_deadtime(int max_timer_to_1_bit,
int number_of_bits)
{
unsigned int deadtime;
deadtime=number_of_bits*max_timer_to_1_bit;
return(deadtime);
}
// ** end adjust_setting_deadtime
//*****************************************************************
// ************************************************
// derive deviation from an integer multiple of the nominal number of
oscillations per bit time
int trimming(int norm_bit, int measurement_result)
{
int border;
int value;
value=measurement_result%norm_bit;
if (value==0 || value==1 || value==norm_bit-1)
{
return(0);
}
border=norm_bit >> 1;
if (value>=border) return(+1);
else return(-1);
}
// end calc_new_freq********************************
```

Although the previous embodiments have mainly been discussed with respect to the implementation into a CAN-bus system, further embodiments of inventive methods or apparatuses may also be implemented in other systems relying on a shared access to a transport medium. This, for example, may be wireless telecommunication systems such as UMTS (Universal Mobile Telecommunication System), LTE (Long Term Evolution), GSM (Global System for Mobile Communications), UWB (Ultra Wide Band), WLAN (Wireless Local Area Network), Bluetooth or the like. Furthermore, the implementation may be performed in other wired communication systems, as for example, LAN, fiber- and copper-based networks and the like.

Embodiments may further provide a computer program having a program code for performing one of the above methods, when the computer program is executed on a computer or processor. A person of skill in the art would readily recognize that steps of various above-described methods can be performed by programmed computers. Herein, some embodiments are also intended to cover program storage devices, e.g., digital data storage media, which are ma-chine or computer readable and encode machine-executable or computer-executable pro-grams of instructions, wherein said instructions perform some or all of the steps of said above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", "means for forming", "means for determining" etc., may be provided through the use of dedicated hardware, such as "a former", "a determiner", etc. as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons.

Furthermore, in some embodiments a single step may include or may be broken into multiple substeps. Such substeps may be included and part of the disclosure of this single step unless explicitly excluded.

What is claimed is:

1. A method comprising:
   determining a measured number of cycles of an adjustable oscillator between a first signal and a second signal within a Controller Area Network (CAN) frame transmitted on a Controller Area Network-bus (CAN-bus), wherein determining the measured number of cycles comprises waiting for a predetermined number of cycles of the adjustable oscillator after a detection of the first signal, wherein the predetermined number of cycles is a predefined integer multiple of the nominal number of cycles, and wherein the predefined integer multiple is equal to or smaller than a minimum number of bits of a message transmitted on the bus;
   determining an information about a present cycle time of the adjustable oscillator using the measured number of cycles and a nominal number of cycles per bit time; and
   trimming a cycle time of an adjustable oscillator to match the CAN-bus operating with a predetermined bit time based on the determined information.

2. The method of claim 1, wherein the first signal is associated with a start of frame symbol transmitted at the beginning of a CAN-bus message.

3. The method of claim 1, wherein the predefined integer multiple is an integer number selected from a range between 11 and 24.

4. The method according to claim 1, wherein the first signal and the second signal are falling edges of signals transmitted within a CAN frame.

5. A method comprising:
   determining a measured number of cycles of an adjustable oscillator between a first signal and a second signal within a Controller Area Network (CAN) frame transmitted on a Controller Area Network-bus (CAN-bus);
   determining an information about a present cycle time of the adjustable oscillator using the measured number of cycles and a nominal number of cycles per bit time; and
   trimming a cycle time of an adjustable oscillator to match the CAN-bus operating with a predetermined bit time based on the determined information;
   adjusting the cycle time of the local oscillator when the measured number of cycles deviates from an integer multiple of the nominal number of cycles by more than a predetermined tolerance value,
   wherein the predetermined tolerance value is smaller than or equal to 0.4% of the nominal number of cycles.

6. A method for trimming a cycle time of an adjustable oscillator to match a Controller Area Network-bus (CAN-bus) operating with a predetermined bit time, comprising:
   detecting a first falling edge of a bit transmitted on the bus within a CAN-bus message;
   waiting for a predetermined number of cycles of the adjustable oscillator;
   detecting a second falling edge of a bit transmitted on the bus; and
   determining a measured number of cycles of the adjustable oscillator between the detection of the first falling edge and the second falling edge;
   determining a deviation between the measured number of cycles and an integer multiple of a nominal number of cycles per bit time; and
   adjusting the cycle time of the adjustable oscillator when the deviation is greater than a predetermined tolerance value, wherein adjusting the cycle time comprises increasing or decreasing the cycle time by a fixed value.

7. The method of claim 6, wherein detecting a first falling edge comprises detecting a first falling edge of a start of frame bit transmitted on the bus at the beginning of a CAN-bus message.

8. The method of claim 6, wherein the deviation (D) is determined using the result of the calculation:

$$D = M \text{ MODULO } N,$$

wherein M=the measured number of cycles, and N=the nominal number of cycles per bit time.

9. The method of claim 6, wherein the adjusting the cycle time comprises increasing or decreasing the cycle time by a variable value, the variable value depending on the determined deviation.

10. A method for trimming a cycle time of an adjustable oscillator to match a Controller Area Network-bus (CAN-bus) operating with a predetermined bit time, comprising:
   detecting a first falling edge of a bit transmitted on the bus within a CAN-bus message;
   waiting for a predetermined number of cycles of the adjustable oscillator;
   detecting a second falling edge of a bit transmitted on the bus; and
   determining a measured number of cycles of the adjustable oscillator between the detection of the first falling edge and the second falling edge;
   determining a deviation between the measured number of cycles and an integer multiple of a nominal number of cycles per bit time; and
   adjusting the cycle time of the adjustable oscillator when the deviation is greater than a predetermined tolerance value, wherein the predetermined tolerance value is smaller than or equal to 0.4% of the nominal number of cycles.

11. A method for accessing a Controller Area Network-bus (CAN-bus), comprising:
repeating a method for trimming a cycle time of an adjustable oscillator until a deviation is determined to be smaller than or equal to the predetermined tolerance value, wherein the adjustable oscillator performs the method of:
detecting a first falling edge of a bit transmitted on the bus within a CAN-bus message;
waiting for a predetermined number of cycles of the adjustable oscillator;
detecting a second falling edge of a bit transmitted on the bus;
determining a measured number of cycles of the adjustable oscillator between the detection of the first falling edge and the second falling edge;
determining the deviation between the measured number of cycles and an integer multiple of a nominal number of cycles per bit time; and
adjusting the cycle time of the adjustable oscillator when the deviation is greater than a predetermined tolerance value;
evaluating an error status of a message transmitted on the CAN-bus;
transmitting messages to the CAN-bus only when the error status indicates no error, an acknowledgement error or an CRC error,
while transmitting messages to the CAN-bus, determining the error status of a predetermined number of consecutive messages; and
when the error status of all consecutive messages indicates an error:
stop transmitting messages to the CAN-bus; and
repeating the method for trimming a cycle time of an adjustable oscillator until the deviation is smaller than or equal to the predetermined tolerance value.

12. A Controller Area Network-bus (CAN-bus) communication controller for a CAN-bus operating with a predetermined bit time, comprising:
an adjustable oscillator having an output coupled with an access unit to provide an operating clock signal for the access unit;
an access unit comprising one or more terminals for signal lines of the CAN-bus, the access unit being adapted to detect a first signal and a second signal within a CAN-bus message transmitted on the CAN-bus, wherein the second signal is determined after waiting for a predetermined number of cycles of the adjustable oscillator after the detection of the first signal, wherein the predetermined number of cycles is a predefined integer multiple of a nominal number of cycles, the predefined integer multiple being equal to or smaller than a minimum number of bits of a message transmitted on the bus; and
a controller module coupled to the adjustable oscillator and adapted to determine an information about a present cycle time of the local adjustable oscillator using a measured number of cycles of the adjustable oscillator between the first signal and the second signal and a nominal number of cycles per bit time, wherein the controller is further adapted to trim a cycle time of the adjustable oscillator to match the CAN-bus operating with a predetermined bit time based on the determined information about the present cycle time.

13. The CAN-bus communication controller of claim 12, wherein the access unit is adapted to:
detect a falling edge transmitted on the bus at the beginning of the CAN-bus message as the first signal; and
detect the first falling edge occurring on the bus after a deadtime of a predetermined number of cycles after the detection of the first falling edge as the second signal.

14. The CAN-bus communication controller of claim 12, wherein the controller module is adapted to adjust the cycle time of the local oscillator when the measured number of cycles deviates from an integer multiple of the nominal number of cycles by more than a predetermined tolerance value.

* * * * *

UNITED STATES PATENT AND TRADEMARK OFFICE
CERTIFICATE OF CORRECTION

PATENT NO. : 8,542,069 B2
APPLICATION NO. : 13/241592
DATED : September 24, 2013
INVENTOR(S) : Kelling et al.

It is certified that error appears in the above-identified patent and that said Letters Patent is hereby corrected as shown below:

In the Claims

Column 16, Claim 12, line 19; please delete the word "local"

Signed and Sealed this
Nineteenth Day of November, 2013

Teresa Stanek Rea
*Deputy Director of the United States Patent and Trademark Office*